United States Patent [19]
Sadlier

[11] Patent Number: 5,363,982
[45] Date of Patent: Nov. 15, 1994

[54] MULTI-LAYERED INSULATED CUP FORMED OF ONE CONTINUOUS SHEET

[76] Inventor: Claus E. Sadlier, 2295 Francisco St., #303, San Francisco, Calif. 94123

[21] Appl. No.: 206,716

[22] Filed: Mar. 7, 1994

[51] Int. Cl.$^5$ ............................................. B65D 3/22
[52] U.S. Cl. ...................................... 220/441; 220/416; 229/1.5 B; 493/76; 493/108; 493/111; 493/152
[58] Field of Search .................. 229/1.5 B, 4.5; 220/441, 443, 416; 493/74, 76, 79, 104–108, 111–113, 152, 906

[56] References Cited

U.S. PATENT DOCUMENTS

| | | | |
|---|---|---|---|
| 1,098,178 | 5/1914 | Semple | 220/441 |
| 1,771,765 | 7/1930 | Benson . | |
| 1,962,199 | 6/1934 | Koch et al. | 493/152 |
| 2,266,828 | 12/1941 | Sykes | 229/14 |
| 2,591,578 | 4/1952 | McNealy et al. . | |
| 2,661,889 | 12/1953 | Phinney | 229/14 |
| 2,695,744 | 11/1954 | Gattuso | 220/441 |
| 2,828,903 | 4/1958 | Adkins . | |
| 3,079,027 | 2/1963 | Edwards | 220/9 |
| 3,194,468 | 7/1965 | Baron | 229/1.5 |
| 3,443,715 | 5/1969 | Edwards | 220/9 |
| 3,456,860 | 7/1969 | Janninck | 229/1.5 |
| 3,503,310 | 3/1970 | Goetz | 93/94 |
| 3,908,523 | 9/1975 | Shikaya | 93/36.01 |
| 4,261,501 | 4/1981 | Watkins et al. | 229/1.5 B |
| 4,398,650 | 8/1983 | Holmes et al. | 220/443 |
| 4,836,400 | 6/1989 | Chaffey et al. | 220/81 |
| 4,993,580 | 2/1991 | Smith | 220/443 |
| 5,092,485 | 3/1992 | Lee | 220/441 |
| 5,111,957 | 5/1992 | Hollander et al. | 220/441 |
| 5,145,107 | 9/1992 | Silver et al. | 229/1.5 B |
| 5,205,473 | 4/1993 | Coffin, Sr. | 229/1.5 B |
| 5,226,585 | 7/1993 | Varano | 229/1.5 B |

Primary Examiner—Gary E. Elkins
Attorney, Agent, or Firm—David Pressman

[57] ABSTRACT

A thermally insulated cup or container (30) includes a smooth outer shell (12S), a smooth inner shell (13S), a corrugated layer (11L) sandwiched therebetween, and a bottom closure (14). The inner shell, corrugated layer, and outer shell are formed by simply winding a continuous elongated paper sheet (10) in a three-layered spiral, then sealing them together. The corrugated layer forms many air pockets between the shells to thermally insulate the contents of the cup, and also provide structural strength. The paper construction of the cup makes it biodegradable and recyclable, and the simple construction method of the cup makes it easy and inexpensive to manufacture.

23 Claims, 3 Drawing Sheets

MULTI-LAYERED INSULATED CUP FORMED OF ONE CONTINUOUS SHEET

BACKGROUND OF THE INVENTION

1. Field of Invention

This invention relates generally to disposable cups, specifically to an insulated paper cup.

2. Prior Art

There are three main types of disposable cups: paper, expanded resin, and polystyrene. Polystyrene cups are aesthetically pleasing, but they can only be used for holding cold drinks, and are not biodegradable or recyclable. Cups of expanded synthetic resin material, sold under the trademark Styrofoam, are excellent thermal insulators, so that they can maintain the temperature of a drink, whether hot or cold, for long periods of time. They are comfortable to handle because their exteriors stay close to ambient temperature, regardless of the temperature of the drink. However, they are environmentally unfriendly, because they are not biodegradable or recyclable. As a result, they are being banned from many municipalities.

Standard single-layer paper cups are recyclable, and therefore more environmentally sound. However, they are poor thermal insulators, so that a beverage in a paper cup quickly looses its cold or heat. They are also uncomfortable to handle, because a hot drink can burn a hand, whereas a cold drink will cause condensation on their outsides, making them slippery and difficult to hold. Their single-layer construction makes them fragile, so that large cups filled with liquid easily crumble after prolonged handling.

Multi-layered paper cups have been designed for providing thermal insulation and increased strength. U.S. Pat. Nos. 2,661,889 to Phinney (1948), 4,993,580 to Smith (1991), 5,092,485 to Lee (1992), and 5,205,473 to Coffin (1993) show three-layered cups with smooth outer and inner shells, and a corrugated middle layer. The corrugated layer provides air pockets for thermal insulation and added strength to withstand prolonged handling.

Although strong and thermally efficient, these cups are all expensive to manufacture, because their three layers are formed separately and then assembled together. This requires at least three glue joints for the forming the layers into tapered cylinders, two glue joints for assembling the layers together, and a glue joint for attaching the bottom. Some cups require even more glue joints. The liberal use of glue renders the cups difficult or impossible to recycle. The layers are usually formed from arc-shaped sheets cut separately from blanks, so that they do not make the most efficient use of paper. Furthermore, the many manufacturing steps required make them too expensive to market. As a result, these cups have never achieved commercial success.

OBJECTS AND ADVANTAGES

Accordingly, several objects and advantages of the invention are to provide a cup which is thermally insulated for comfortable handling and for maintaining the temperature of its contents, which is sturdy enough for withstanding prolonged handling, which is biodegradable and recyclable, and which is easy and inexpensive to manufacture.

Further objects and advantages will become apparent from a study of the following description and the accompanying drawings.

DRAWING FIGURES

Figure 1A:
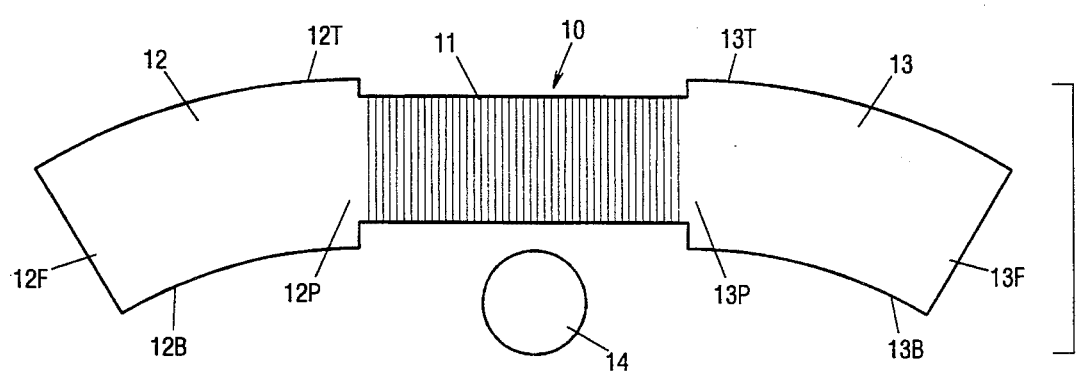
FIG. 1A is an exploded side view of paper sheets for making a cup in accordance with a first embodiment of the invention.

| Drawing Reference Numerals |
| --- |
| 10. Continuous Sheet |
| 11. Corrugated Portion |
| 12. Smooth Portion |
| 13. Smooth Portion |
| 14. Bottom Closure |
| 15. Air Pockets |
| 16. Water-Proof Coating |
| 17. Reflective Coating |
| 20. Continuous Sheet |
| 21. Corrugated Piece |
| 22. Smooth Piece |
| 23. Smooth Piece |
| 24. Bottom Closure |
| 30. Cup |

SUMMARY OF THE INVENTION

In accordance with the present invention, a thermally insulated cup is formed from one continuous sheet of paper having two smooth portions and a corrugated portion therebetween. The sheet is wound into a three-layered spiral, then the ends of each smooth portion are glued together for forming cylindrical inner and outer shells that sandwich the corrugated portion therebetween. A bottom closure is attached to the inner shell. The resulting three-layered cup is strong, and offers good thermal insulation for comfortable handling and maintaining the temperature of its contents.

DESCRIPTION—FIGS. 1A TO 1C—PAPER SHEETS

Figure 1B:
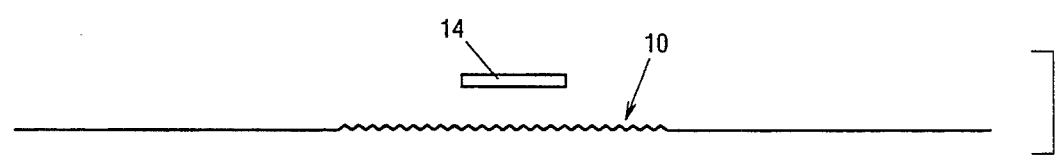
Fig. 1B is an exploded edge-on view of the paper sheets of FIG. 1A.

In accordance with a first embodiment of the invention shown in the exploded side view in FIG. 1A, a cup or container (FIG. 3) begins as a continuous, homogeneous sheet 10, which is die cut from blank paper stock (not shown). Sheet 10 includes a rectangular, corrugated portion 11, and two wider, arc-shaped, smooth portions 12 and 13 extending from either side of corrugated portion 11. Smooth portions 12 and 13 have proximal ends 12P and 13P, respectively, free ends 12F and 13F, top edges 12T and 13T, and bottoms edges 12B and 13B. Cutting corrugated portion 11 as a straight piece allows multiple sheets 10 to be cut very closely from the same blank, which makes the most efficient use of the paper stock. A round, bottom closure 14 is cut separately. The corrugations in portion 11 are clearly shown in the edge-on view in Fig. 1B. They are formed by methods well known in the art.

Figure 1C:
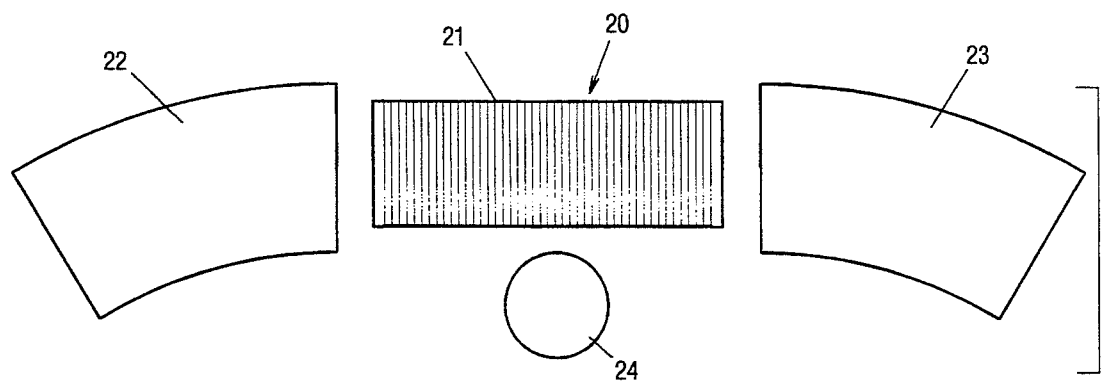
FIG. 1C is an exploded side view of paper sheets for making a cup in accordance with a second embodiment of the invention.

In accordance with a second embodiment of the invention shown in the exploded side view in FIG. 1C, a continuous sheet 20 can be formed by gluing together the appropriate edges of a corrugated piece 21 and separate smooth pieces 22 and 23. Bottom closure 24 is also cut separately. Corrugated piece 21 is slightly longer than corrugated portion 11 shown in FIG. 1A, so that its ends slightly overlap smooth pieces 22 and 23 for gluing. Cutting the three pieces separately may allow them to be cut even more efficiently from the paper stock.

DESCRIPTION—FIGS. 2A AND 2B—MANUFACTURING PROCESS

Figure 2A:
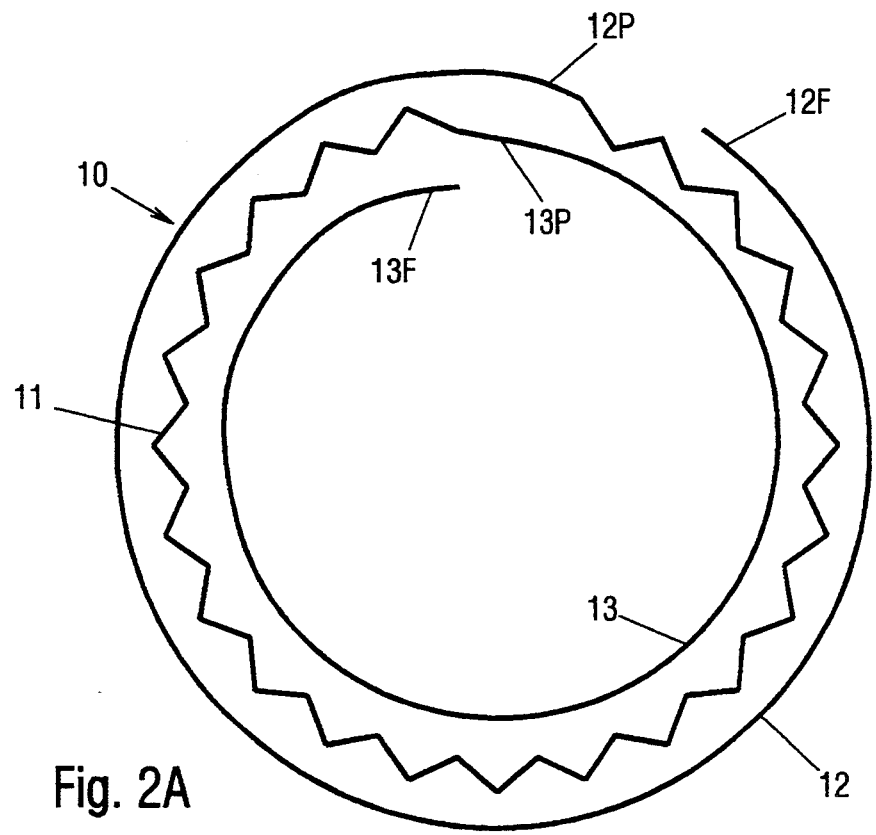
FIG. 2A is a top view of the paper sheet of FIG. 1A during a stage in manufacturing.
Figure 2B:
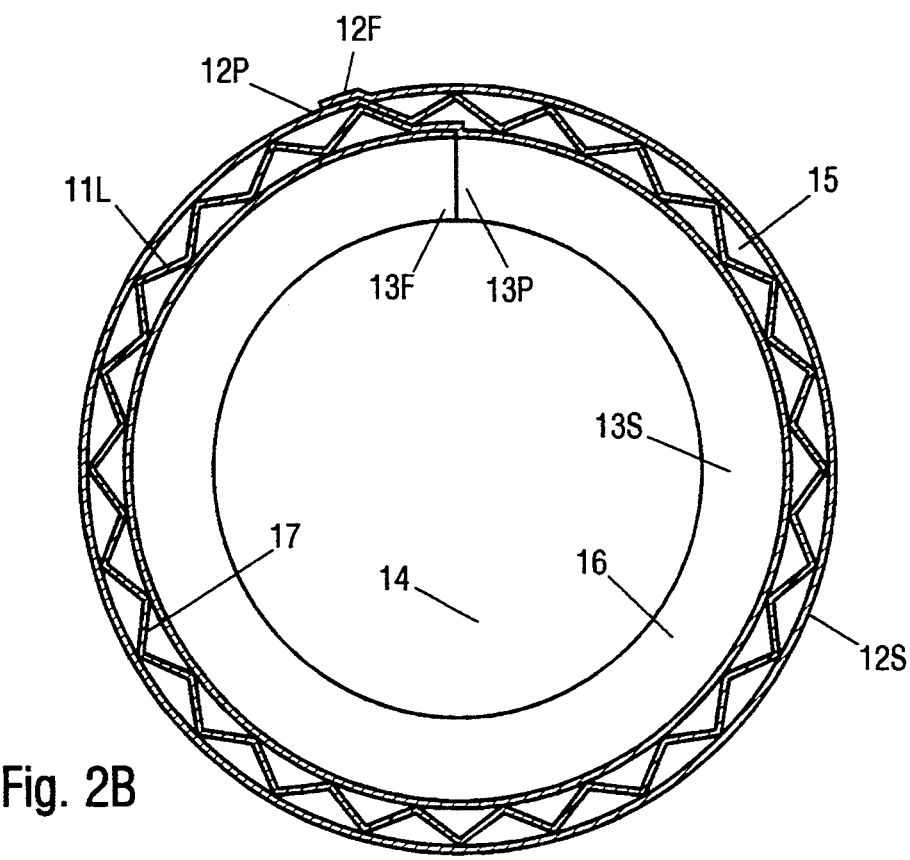
FIG. 2B is a top sectional view of the finished cup.

The cup (FIG. 3) is formed by winding sheet 10 into a spiral, as shown in FIG. 2A. Free end 13F is glued or otherwise joined to proximal end 13 P to form a tapered cylindrical inner shell 13S. Then free end 12F is joined to proximal end 12P to form a tapered cylindrical outer shell 12S, as shown in FIG. 2B. Corrugated portion 11 is thus sandwiched between the shells to form a corrugated layer 11L. Bottom closure 14 is attached within inner shell 13S, as will be explained in conjunction with FIG. 3.

Smooth portion 13 is slightly longer than the circumference of inner shell 13S, so that the excess at its ends overlap for gluing. Although corrugated portion 11 (FIG. 1A) is rectangular, it can be wrapped around tapered inner shell 13S by spreading its corrugations wider at its top. Smooth portion 12 is longer than smooth portion 13, so that after they are formed into cylinders, outer shell 12S is larger in diameter than inner shell 13 S for accommodating the thickness of corrugated layer 11L. End portion 12 is also longer than the circumference of outer shell 12S, so that the excess at its ends overlap for gluing. Although sheet 10 is used in this example, sheet 20 (FIG. 1C) can also be used.

Thus constructed, corrugated layer 11L forms many thermally insulating air pockets 15 between itself and the shells. After the cup is assembled, it is coated with a suitable waterproofing material 16, such as plastic or wax. The inside surface of middle layer 11L is optionally coated with a reflective material 17. This will reflect radiant heat back to its source, whether from the cup's contents or from the air outside the cup, so that thermal efficiency is further improved. Because the three layers of the cup are constructed by simply winding sheet 10 into a spiral, it is very easy and economical to manufacture.

DESCRIPTION—FIGS. 3—SIDE SECTIONAL VIEW

Figure 3:
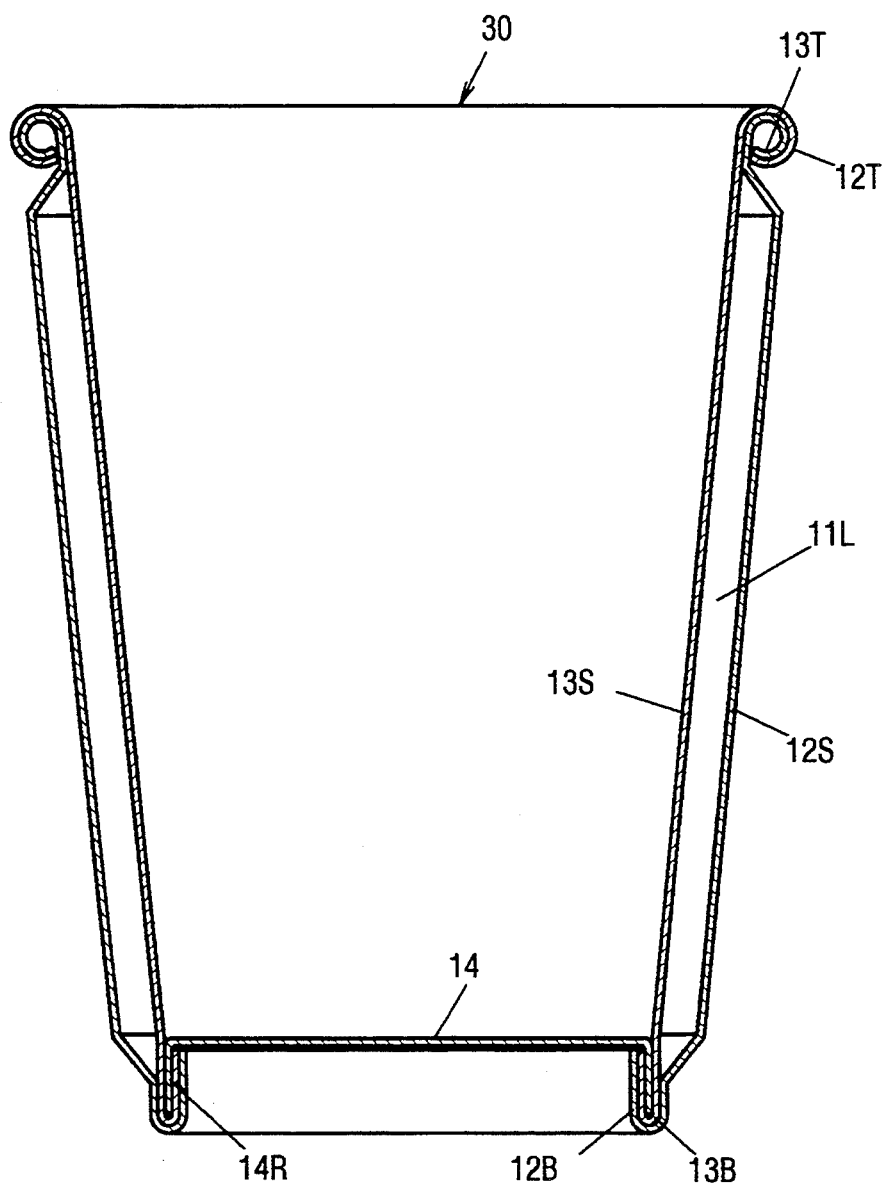
FIG. 3 is a side sectional view of the finished cup.

As shown in the side sectional view in FIG. 3, cup 30 includes three layers formed by outer shell 12S, corrugated layer 11L, and inner shell 13S. Top edges 12T and 13T are crimped together and rolled outwardly to form a rim. Bottom edges 12B and 13B are folded inwardly, and glued to the inside of a rim 14R on bottom closure 14 for a watertight seal. Because corrugated portion 11 (FIG. 1A) is narrower than smooth portions 12 and 13 (FIG. 1A), the top and bottom edges of corrugated layer 11L stay clear of the crimped top and bottom of cup 30.

SUMMARY, RAMIFICATIONS AND SCOPE

Accordingly the reader will see that I have provided a thermally insulated cup or container which will maintain the temperature of its contents much longer than non-insulated cups. When it is holding a hot beverage, it will maintain its outer shell at close to ambient temperature, so that the cup will be comfortable to handle. When it is holding a cold beverage, it will prevent condensation from forming on its outer shell, so that it will not become slippery. The corrugated, three-layered construction makes it strong enough to withstand prolonged handling. Its paper construction and its minimal use of glue makes it biodegradable and recyclable. Its design makes very efficient use of paper stock, so that it consumes a minimal amount of natural resources. Because its three layers are constructed by simply winding a single piece of paper around in a spiral, it can be easily and inexpensively manufactured.

Although the above descriptions are specific, they should not be considered as limitations on the scope of the invention, but only as examples of the preferred embodiment. Many other ramifications and variations are possible within the teachings of the invention. For example, instead of paper, other suitable materials, such as plastic, if available, can be used. The reflective coating can be eliminated. The three separate elongated pieces shown in FIG. 1C can be crimped instead of glued together. The construction method of forming a three-layered cup from a continuous sheet can be used for creating types of insulated containers, such as milk cartons, ice cream cartons, etc. The corrugations of the middle layer, instead of vertical ribs, can take other forms, such as an array of dimples, horizontal ribs, etc. Therefore the reader is requested to determine the scope of the invention by the appended claims and their legal equivalents, and not by the examples given.

I claim:

1. A thermally insulated container, comprising:
   a smooth outer shell,
   a smooth inner shell concentrically positioned within said smooth outer shell,
   a corrugated layer sandwiched between said smooth outer shell and said smooth inner shell, and
   a bottom closure attached to a bottom portion of said smooth inner shell,
   said smooth outer shell, said smooth inner shell, and said corrugated layer all formed of one continuous elongated sheet wound in a spiral,
   whereby said smooth outer shell, said corrugated layer, and said smooth inner shell cooperate to define plural air pockets therebetween for providing thermal insulation for any material disposed within said container, yet said container is easy and economical to fabricate.

2. The thermally insulated container of claim 1 wherein said one continuous elongated sheet is paper.

3. The thermally insulated container of claim 1, further including a waterproof coating disposed on said smooth inner shell and said bottom closure.

4. The thermally insulated container of claim 3 wherein said waterproof coating is plastic.

5. The thermally insulated container of claim 3 wherein said waterproof coating is wax.

6. The thermally insulated container of claim 1, further including a reflective coating disposed on said corrugated layer for reflecting radiant heat.

7. The thermally insulated container of claim 1 wherein said smooth outer shell, said smooth inner shell, and said corrugated layer are formed from three separate pieces which are attached together to form said one continuous elongated sheet.

8. The thermally insulated container of claim 1 wherein said one continuous elongated sheet is homogeneous.

9. A thermally insulated container, comprising:
a tapered smooth cylindrical outer shell,
a tapered smooth cylindrical inner shell concentrically positioned within said smooth cylindrical outer shell,
a corrugated layer sandwiched between said smooth cylindrical outer shell and said smooth cylindrical inner shell, and
a bottom closure attached to a bottom portion of said smooth cylindrical inner shell,
said smooth cylindrical outer shell, said smooth cylindrical inner shell, and said corrugated layer all formed of one continuous elongated sheet wound in a spiral,
whereby said smooth cylindrical outer shell, said corrugated layer, and said smooth cylindrical inner shell cooperate to define plural air pockets therebetween for providing thermal insulation for material disposed within said container, yet said container is easy and economical to fabricate.

10. The thermally insulated container of claim 9 wherein said one continuous elongated sheet is paper.

11. The thermally insulated container of claim 9, further including waterproof coating disposed on said tapered smooth cylindrical inner shell and said bottom closure.

12. The thermally insulated container of claim 11 wherein said waterproof coating is plastic.

13. The thermally insulated container of claim 11 wherein said waterproof coating is wax.

14. The thermally insulated container of claim 9, further including a reflective coating disposed on said corrugated layer for reflecting radiant heat.

15. The thermally insulated container of claim 9 wherein said smooth cylindrical outer shell, said smooth cylindrical inner shell, and said corrugated layer are formed from three separate pieces which are attached together to form said one continuous elongated sheet.

16. The thermally insulated container of claim 9 wherein said one continuous elongated sheet is homogeneous.

17. A method of making a then ally insulated container, comprising:
providing a continuous elongated sheet having spaced apart first and second smooth portions connected by a corrugated portion therebetween, each of said smooth portions having two end portions,
winding said continuous elongated sheet into a three-layered spiral,
joining said end portions of said First smooth portion to form a cylindrical inner shell with a bottom portion,
joining said end portions of said second smooth portion to form a cylindrical outer shell, so that said corrugated portion is sandwiched between said cylindrical inner shell and said cylindrical outer shell, and
sealing said bottom portion of said inner shell with a bottom closure,
whereby said cylindrical outer shell, said corrugated portion, and said cylindrical inner shell cooperate to define plural air pockets therebetween for providing thermal insulation for any substance disposed within said container, yet said container is easy and economical to fabricate.

18. The method of claim 17 wherein said elongated sheet is paper.

19. The method of claim 17 wherein said smooth portions and said corrugated portion each have a predetermined length and a predetermined width, said smooth portions being wider than said corrugated portion.

20. The method of claim 17 wherein said smooth portions are arc-shaped so that said cylindrical shells will be tapered.

21. The method of claim 17, further including disposing a reflective coating on said corrugated portion for reflecting radiant heat.

22. The method of claim 17, further including providing said first and second smooth portions and said corrugated portion as three separate pieces and attaching said three separate pieces together to form said continuous elongated sheet.

23. The method of claim 17 wherein said first and second smooth portions and said corrugated portion are provided as one homogeneous sheet.

* * * * *

UNITED STATES PATENT AND TRADEMARK OFFICE
CERTIFICATE OF CORRECTION

PATENT NO. : 5,363,982
DATED : November 15, 1994
INVENTOR(S) : Claus E. Sadlier

It is certified that error appears in the above-indentified patent and that said Letters Patent is hereby corrected as shown below:

Col. 5, line 44, change "then ally" to —thermally—.
Col. 6, line 7, change "First" to —first—.

Signed and Sealed this

Tenth Day of January, 1995

*Attest:*

BRUCE LEHMAN

*Attesting Officer*     *Commissioner of Patents and Trademarks*